United States Patent [19]

Fender

[11] 3,872,302

[45] Mar. 18, 1975

[54] IMAGE INTENSIFIER SYSTEM WITH RETICLE BRIGHTNESS CONTROL

[75] Inventor: Ferdinand G. Fender, Glenview, Ill.

[73] Assignee: Ni-Tec, Skokie, Ill.

[22] Filed: Mar. 20, 1974

[21] Appl. No.: 452,801

[52] U.S. Cl. .................................. 250/213, 250/205

[51] Int. Cl. ............................ G01j 1/32, H01j 31/50

[58] Field of Search .. 250/213 VT, 552, 205, 213 R

[56] References Cited

UNITED STATES PATENTS 3,666,957 5/1972 Wyess ............................ 250/213 VT 3,694,659 9/1972 Ramsay ........................ 250/213 VT

*Primary Examiner*—James W. Lawrence
*Assistant Examiner*—T. N. Grigsby
*Attorney, Agent, or Firm*—Richard O. Gray, Jr.

[57] ABSTRACT

An image intensifier system which amplifies and displays both an object image and a reticle image has a unique reticle brightness control for regulating the brightness of the reticle image. The reticle brightness control senses the gain of the system and regulates the brightness of the reticle inversely with the system gain to maintain a visible reticle image at the system output screen regardless of the system gain.

12 Claims, 3 Drawing Figures

IMAGE INTENSIFIER SYSTEM WITH RETICLE BRIGHTNESS CONTROL

BACKGROUND OF THE INVENTION

Image intensifier systems are well-known. They are generally constructed to receive at a cathode structure object images of low intensity radiant-energy, convert the radiant-energy image to electron images, amplify the electron images and then focus the amplified electron images onto a display screen which converts the electron images to visible images. Because the electron image amplifiers are capable of extremely high gain, very low intensity object images can be displayed. Such systems therefore find broad application for night viewing in such applications as security surveillance, for example.

In some applications it is desirable to superimpose a reticle image onto the object image as in the case of sights for long range, high-powered rifles. The reticle image is usually generated by a small reticle projector which projects the reticle image onto the cathode structure so as to be amplified and displayed along with the object.

Unfortunately, because the reticle image is processed along with the object images, when the system gain is decreased to accommodate higher intensity object images, the reticle may be diminished to the point where it is lost entirely. At the other extreme, when the system gain is increased to detect low intensity object images, the reticle becomes so bright that it interferes with the low intensity image detection.

To overcome these difficulties, image intensifiers of the prior art have been equipped with a separate manual control to adjust reticle brightness. However, this means that there are two controls to be manipulated by the operator, one for system gain, and the other for reticle brightness. Past experience has shown that such systems are extremely cumbersome in use. Additionally, where a number of object images of varying intensities are to be scanned, it is not always possible to adjust the reticle brightness fast enough to accommodate each object image intensity.

Prior art intensifier systems also have included a safety feature which senses the display screen brightness to greatly diminish the system gain when the screen brightness exceeds a certain level. This feature has been provided to avoid light flashes in the operator's eyes and to extend the life of the system's display screen. However, because the system gain is nearly entirely diminished, loss of the reticle ensues.

It is therefore a general object of the present invention to provide an improved image intensifier system.

It is a further object of the present invention to provide an image intensifier system which maintains a visible reticle image at the output screen of the system at a predetermined intensity regardless of the system gain.

In general, the present invention provides an image intensifier system comprising a cathode structure responsive to impinging radiant-energy images to develop corresponding electron images, reticle generating means for projecting a reticle image of radiant-energy onto the cathode structure and display means for converting the electron images to visible images. The present invention further includes amplifying means including variable gain control for amplifying the electron images by a selectable gain and for focusing the amplified electron images onto the display means, gain sensing means for sensing the gain of the amplifying means and for developing a reticle image intensity control signal having a magnitude inversely related to the gain of the amplifying means and means coupling the gain sensing means to the reticle generating means for applying the reticle image intensity control signal to the reticle generating means. As the gain of the amplifying means varies, the reticle image intensity control signal regulates the intensity of the imposed reticle image inversely with the system gain to maintain at the display means a visible reticle notwithstanding variations in the gain of the amplifying means.

BRIEF DESCRIPTION OF THE DRAWINGS

The invention, together with further objects and advantages thereof, may best be understood by reference to the following description in conjunction with the accompanying drawings and in the several figures of which like reference numerals indicate identical elements and in which.

DESCRIPTION OF THE PREFERRED EMBODIMENT

Figure 1:
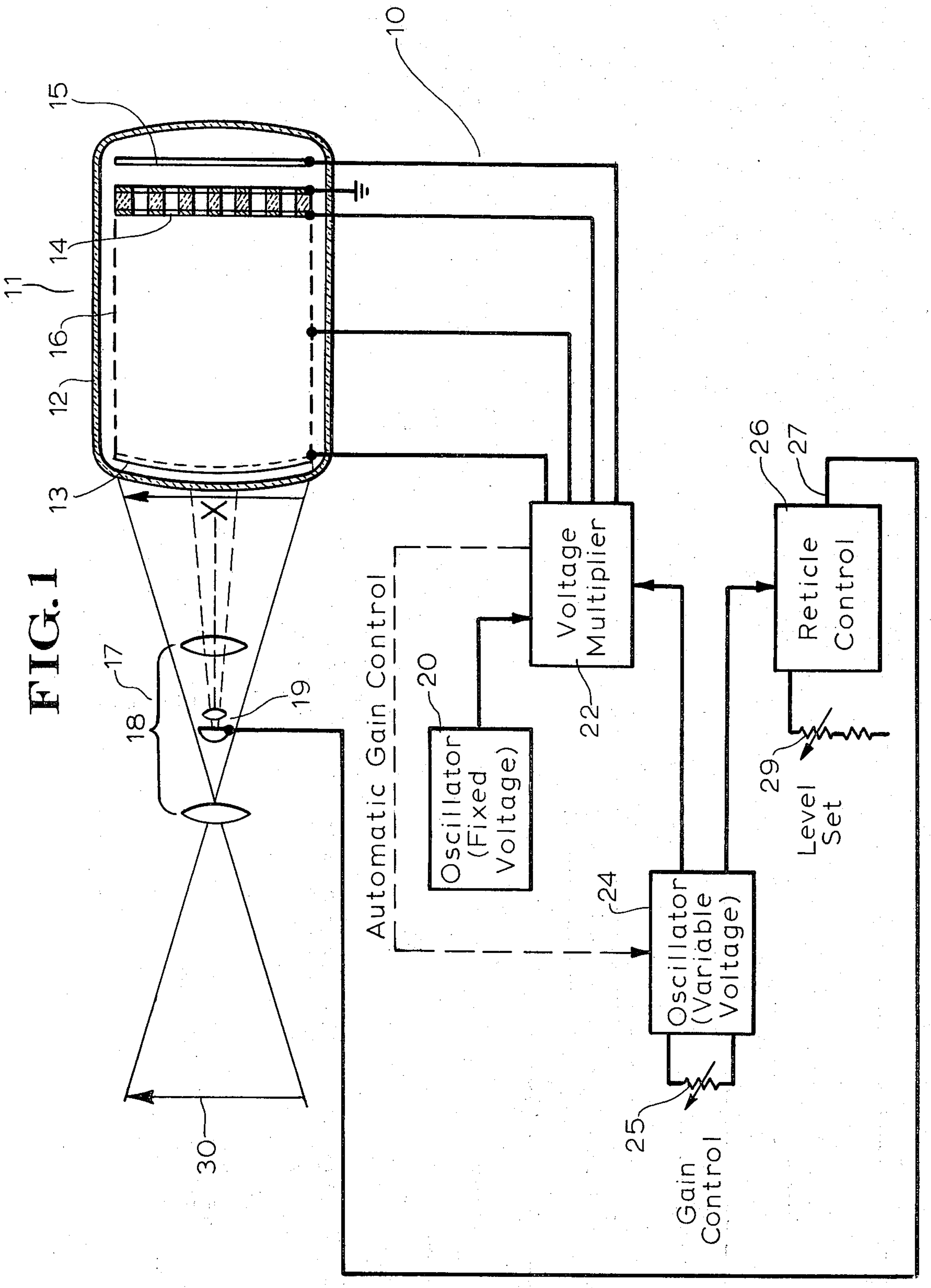
FIG. 1 is a schematic block diagram of an image intensifier system embodying the present invention.

Referring now to FIG. 1, there is shown a block diagram of an image intensifier system embodying the present invention. The image intensifier system generally designated as 10 includes an image intensifier tube 11, an optical lens system 17, a fixed voltage oscillator 20, a voltage multiplier 22, a variable voltage oscillator 24 and a reticle control circuit 26.

Intensifier tube 11 includes an envelope 12 of glass or other suitable material capable of sustaining a vacuum within image intensifier tube 11. Intensifier tube 11 also includes an input cathode structure 13 of photoemissive material. The photoemissive cathode structure responds to an object image 30 of radiant-energy impinging thereon to develop a corresponding electron image. Usually, such a cathode structure is a sandwich or a multilayer arrangement having, for example, a foundation or substrate which is transparent to the form of energy for which a response is desired and having, thereover fluorescent or similar layer for converting the radiant image to a light image. A photosensitive layer is superimposed over the fluorsecent layer and sometimes there is an interposed barrier layer to prevent unwanted chemical interactions. Cathode structures of this type are well-known in the art and when energized develop electron images corresponding to images of radiant-energy.

The image intensifier tube 11 additionally includes a channel multiplier plate 14 which amplifies the electron images produced by cathode structure 13 and proximity focuses the amplified electron images onto closely spaced output display screen 15. Output display screen 15 is of a fluorescent material and converts the amplified electron images to visible images.

An electro-optical system 16 accelerates and focuses the electron images upon channel multiplier plate 14.

As well known, the electron images experience multiplication within channel plate 14 thereby being amplified for viewing on screen 15.

The optical lens system 17 comprises lenses 18 which focus object image 30 onto cathode structure 13. Located within the optical lens system is a reticle generating means 19 including a light emitting diode. The light emitting diode emits light which is directed through a reticle forming mask or screen and a small lens for projecting the reticle image of radiant-energy onto cathode structure 13. Therefore, it can be seen, that the reticle generating means 19 superimposes a reticle image onto the cathode structure 13.

Because image intensifier systems are generally used in environments where portability is required, they normally are powered by low voltage D.C. batteries. Fixed voltage oscillator 20 and variable voltage oscillator 24 convert the low D.C. voltage of the batteries to A.C. voltages. The oscillators drive voltage multiplier 24 which rectifies and multiplies the oscillator A.C. voltages to produce the image intensifier tube operating potentials. Such oscillators are well-known in the art and therefore will not be described in detail here.

Oscillator 20 maintains a fixed output voltage which drives the portions of the voltage multiplier which supplies operating potentials to screen 15, cathode structure 13 and electro-optic system 16. Variable voltage oscillator 24 drives that portion of voltage multiplier 22 which supplies the operating potential to channel multiplier plate 14. The voltage supplied channel multiplier plate 14 is the voltage which determines the channel multiplier plate gain and for that matter the gain of the image intensifier system.

Variable voltage oscillator 24 includes a gain control 25 which is typically located within the feedback circuit of oscillator 24 for varying the oscillator output voltage supplied to voltage multiplier 22 to in turn vary the gain of the image intensifier system.

As can be appreciated thus far, both the reticle image and the object image 30 are processed by the image intensifier tube 11 simultaneously. Therefore, if object image 30 is of high intensity, gain control 25 would be varied to decrease the gain of the intensifier system. However, this also decrease the brightness of the reticle image on screen 15. A low intensity object image would dictate increasing the gain of the intensifier system and thus increasing the brightness of the reticle image on screen 15. Thus, for a high intensity object image the reticle may be too bright thus interfering with the low intensity object image detection. In order to alleviate this difficulty, the image intensifier system of the present invention includes reticle brightness control circuit 26. It is coupled to the variable voltage oscillator 24 and senses the gain of the image intensifier system to provide at its output 27 reticle image intensity control signals inversely related to the gain of the intensifier system. The reticle image intensity control signal is applied to the reticle generating means 19 by means of conductor 28. Because the magnitude of the control signal 19 is inversely related to intensifier tube gain, the brightness of the reticle image on screen 15 will always remain visible as the gain of the intensifier system is varied.

The reticle control circuit 26 additionally includes a level set control 29 which allows for operator preference as to reticle contrast and to accommodate for variations in intensifier gain versus voltage characteristics.

Figure 2:
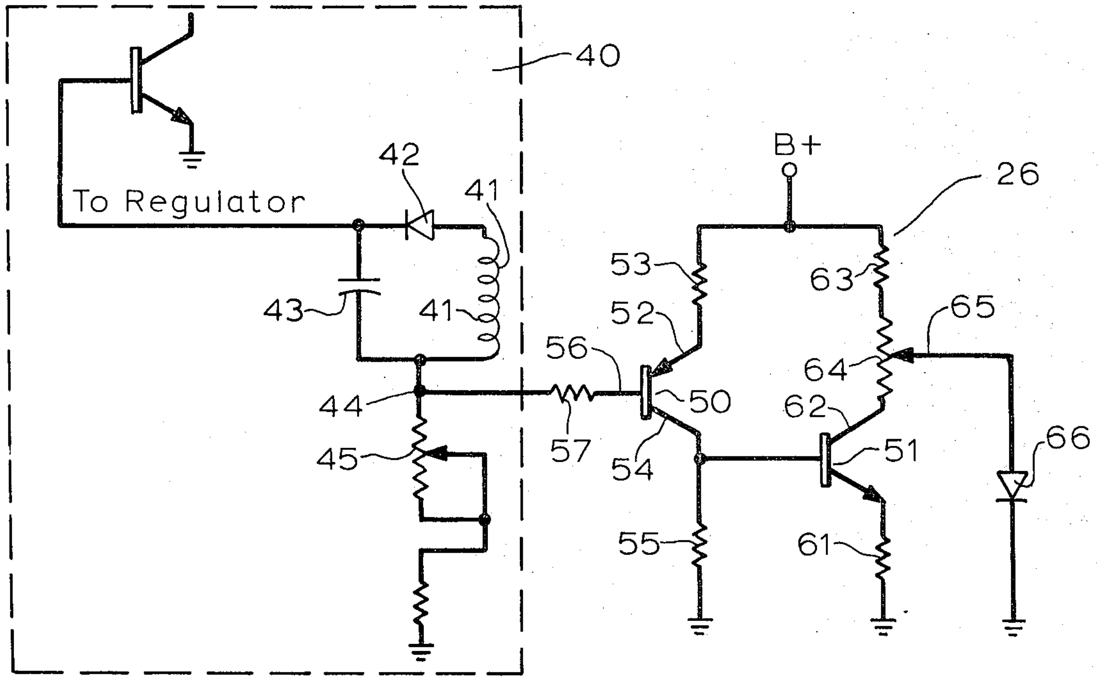
FIG. 2 is a schematic circuit diagram showing one form in which the gain sensing means of the image intensifier system embodying the present invention may take.

FIG. 2 shows one form which the reticle control circuit may take. The block 40 generally designates a portion of the feedback circuit of variable voltage oscillator 24 of FIG. 1. It includes transformer winding 41 which is inductively coupled to the output portion of the oscillator. Diode 42 and capacitor 43 coact to rectify and filter the feedback voltage to produce at junction 44 a rectified and filtered voltage indicative of the oscillator output and therefore the intensifier system gain. Variable resistor 45 is used to increase and decrease the amount of feedback to the oscillator for varying the intensifier system gain.

The reticle control circuit 26 comprises first transistor 50 and second transistor 51. Coupled between emitter 52 of first transistor 50 and the B+ battery voltage supply is an emitter resistor 53. Collector 54 is coupled to ground through collector resistor 55. The base 56 of first transistor 50 is coupled to junction 44 by base resistor 57. As shown in the figure, collector 54 is coupled to base 60 of second transistor 51.

The second transistor 51 has emitter resistor 61 coupling its emitter to ground. Between the collector 62 and the B+ supply are serially coupled resistors 63 and 64. Resistor 64 is variable and its wiper 65 is coupled to the light emitting diode 66 which is located within the reticle image generating means 19 of FIG. 1. The control signal is therefore provided at wiper 65 of variable resistor 64. The setting of resistor 64 sets the initial brightness of the reticle.

In operation, when resistor 45 is increased, the negative feedback to the oscillator is decreased thus increasing the intensifier system gain. Thus causes junction 44 to become more negative. As a result, the voltage at collector 54 becomes more positive and the voltage at collector 62 becomes more negative. Therefore, the control signal at wiper 65 becomes more negative thus causing light emitting diode 66 to receive less current decreasing the intensity of light emitting diode 66. This of course, decrease the intensity of the reticle image superimposed upon the cathode structure 13 of FIG. 1.

As can be seen from the foregoing, the reticle control circuit 26 senses the intensifier system gain by sensing a portion of the oscillator feedback to develop its control signal which is inversely related to the gain of the intensifier system.

Obviously, if resistor 45 is increased, the overall system gain decreases and the opposite result of that described above is obtained, that is, the reticle intensity increases.

Figure 3:
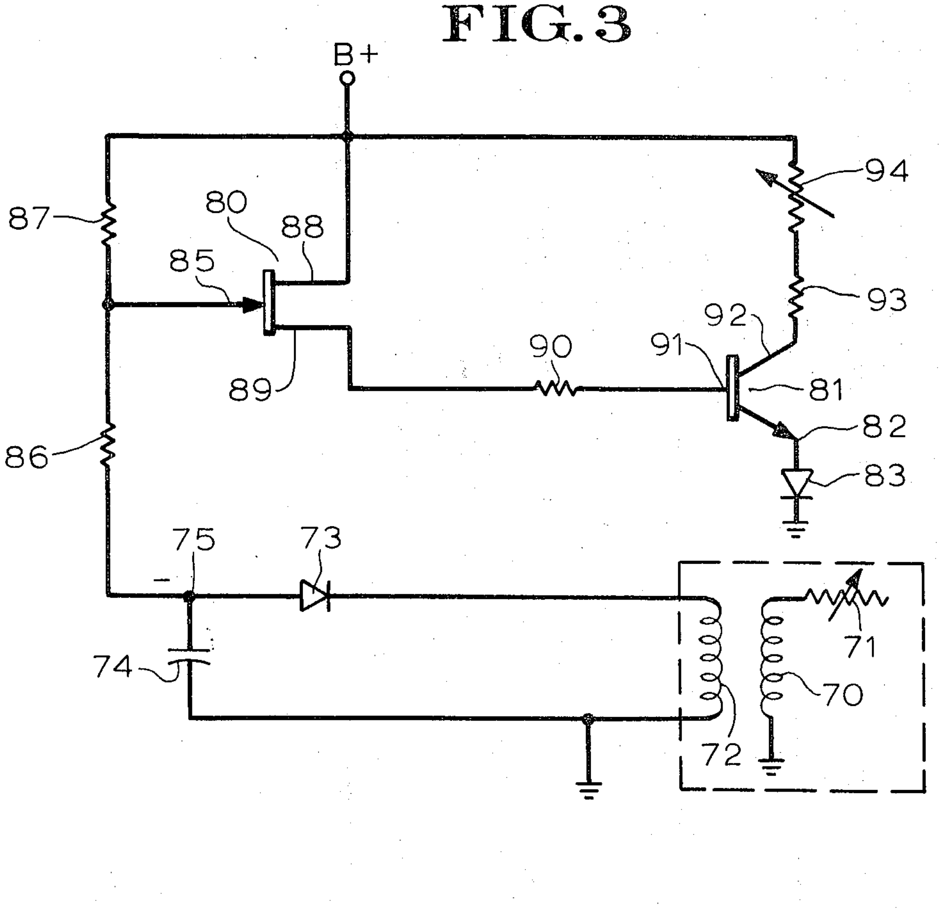
FIG. 3 is a schematic circuit diagram of another form in which the gain sensing means of the image intensifier system embodying the present invention may take.

The reticle control circuit of FIG. 2 as just described is coupled directly to the feedback circuit of the oscillator. Referring now to FIG. 3, there is shown an embodiment of the present invention which shows a reticle control circuit inductively coupled to the feedback circuit of variable voltage oscillator 24.

As can be seen in FIG. 3, the feedback circuit of variable voltage oscillator 24 includes transformer winding 70 in series with variable resistor 71. Variable resistor 71 controls the amount of feedback to the oscillator and thus the intensifier system gain. The feedback of the oscillator is inductively coupled to transformer winding 72 which has associated with it diode 73 and capacitor 74. Diode 73 and capacitor 74 coact to produce at junction 75 a rectified and filtered negative voltage related to the oscillator feedback voltage and thus the intensifier system gain. Specifically, the voltage at junction 75 becomes more negative as the gain of the system is increased.

The reticle control circuit of FIG. 3 is seen to comprise field effect transistor (FET) 80 and transistor 81. Coupled to the emitter 82 of transistor 81 is light emitting diode 83 which is located within the reticle image generating means 19 of FIG. 1. Between the gate 85 and junction 75 is resistor 86 and between gate 85 and B+ battery supply is resistor 87. The drain 88 of FET 80 is coupled directly to the B+ supply. The source 89 of FET 80 is coupled through resistor 90 to the base 91 of transistor 81. Coupling collector 92 of transistor 81 to the B+ supply are the serially connected resistors 93 and 94. As can be seen from the drawings resistor 94 is variable.

The ratio of resistors 87 and 86, in combination with the resistance setting of resistor 94 sets the initial intensity of light emitting diode 83 to accommodate for operator preference and the variations amongst the different image intensifier tubes as to gain versus voltage characteristics.

In operation, as previously mentioned, as the gain of the intensifier system is increased, junction 75 becomes more negative. This causes gate 85 of FET 80 to become more negative and in turn causes source 89 of FET 80 and base 91 of transistor 92 to become more negative. In this condition, the drive to transistor 81 is decreased thus causing transistor 81 to conduct less current through collector 82 to thereby decrease the intensity of light emitting diode 83.

If the gain of the system is decreased, junction 75 becomes more positive resulting in base 91 of transistor 81 to become more positive increasing its drive and allowing it to conduct more current through collector 82 to light emitting diode 83 to increase its intensity.

Therefore, the configuration of FIG. 3 like that of FIG. 2 senses the intensifier system gain by sensing the feedback voltage of the variable voltage oscillator 24 and develops a control signal which is inversely related to the gain of the intensifier system. The control signal is a current signal and thus decreases the intensity of the light emitting diode in the reticle generating means when the system gain increases and increases the light emitting diode intensity when the system gain decreases. Therefore, notwithstanding variations in intensifier system gain, the present invention provides at the output screen 15 of FIG. 1 a visible reticle image of essentially constant brightness to be viewed by the operator.

The present invention therefore provides an image intensifier system which provides a continuously visible reticle image at its output display screen notwithstanding extreme variations in intensifier system gain. Additionally, the brightness of the output reticle image is essentially constant and this level of brightness can be preset by the operator to accommodate his preference or to allow for the intensifier tube gain versus voltage characteristics. A particular advantage of the present invention is that when a low intensity object image is to be detected, the output reticle image is not so bright that it interferes with the detection of the low intensity object. As a result, only one control needs to be manipulated by the operator, that control being the gain control of the image intensifier system. This makes the intensifier system of the present invention less cumbersome in use and greatly increases the utility of the intensifier system.

While particular embodiments of the invention have been shown and described, modifications may be made, and it is intended in the appended claims to cover all such modifications as may fall within the spirit and scope of the invention.

I claim:

1. An image intensifier system comprising:

a cathode structure responsive to impinging radiant-energy images to develop corresponding electron images;

reticle generating means for projecting a reticle image of radiant-energy onto said cathode structure;

display means for converting said electron images to visible images;

amplifying means including a variable gain control for amplifying said electron images by a selectable gain and for focusing said amplified electron images onto said display means;

gain sensing means for sensing the gain of said amplifying means and for developing a reticle image intensity control signal having a magnitude inversely related to the gain of said amplifying means; and means coupling said gain sensing means to said reticle generating means for applying said reticle image intensity control signal to said reticle generating means; whereby as the gain of said amplifying means varies, said reticle image intensity control signal regulates the intensity of said reticle image to maintain at said display means a visible reticle notwithstanding variations in the gain of said amplifying means.

2. An image intensifier system in accordance with claim 1 wherein said sensing means comprises means for initially selecting the magnitude of said control signal for preselecting the brightness of said visible reticle to be maintained at said display means.

3. An image intensifier system in accordance with claim 1 wherein said system additionally includes an optical lens system for focusing said radiant-energy images onto said cathode structure and wherein said reticle generating means is located within said optical lens system.

4. An image intensifier system in accordance with claim 3 wherein said reticle generating means comprises a projector system including a light emitting diode for projecting said reticle radiant-energy image onto said cathode structure, said reticle image intensity control signal being applied to said light emitting diode for regulating the intensity of the light emitted by said diode.

5. An image intensifier system in accordance with claim 4 wherein said reticle image intensity control signal is a current signal.

6. An image intensifier system in accordance with claim 1 wherein said amplifying means comprises a channel multiplier plate and wherein said variable gain control comprises a variable voltage oscillator having an adjustable feedback circuit, and said output being coupled to said channel plate to control the gain of said channel plate.

7. An image intensifier system in accordance with claim 6 wherein said gain sensing means is coupled to said feedback circuit for developing said reticle image intensity control signal inversely related to said channel plate gain.

8. An image intensifier system in accordance with claim 7 wherein said sensing means includes a first transistor and a second transistor, the base of said first transistor being directly coupled between said feedback circuit and the collector of said second transistor providing said reticle image intensity control signal.

9. An image intensifier system in accordance with claim 7 wherein said sensing means is inductively coupled to said feedback circuit.

10. An image intensifier system in accordance with claim 9 wherein said sensing means comprises a first transistor and a second transistor, said first transistor being coupled between said feedback circuit and said second transistor, said second transistor having an emitter and providing at said emitter said reticle image intensity control signal.

11. An image intensifier system in accordance with claim 10 wherein said first transistor is a field effect transistor.

12. An image intensifier system comprising:

a cathode structure responsive to impinging radiant-energy images to develop corresponding electron images;

an optical lens system for focusing said radiant-energy images onto said cathode structure;

reticle generating means within said opticle lens system, said reticle generating means comprising a projector system including a light emitting diode for projecting a reticle image of radiant-energy onto said cathode structure;

display means for converting said electron images to visible images;

amplifying means comprising a channel multiplier plate and a variable gain control including a variable voltage oscillator having an adjustable feedback circuit and an output, said output being coupled to said channel multiplier plate and providing at said output a voltage dependent upon the adjustment of said feedback circuit to control the gain of said channel multiplier plate for amplifying said electron images by a selectable gain and said channel plate and said display means being arranged for proximity focusing said amplified electron images onto said display means;

gain sensing means coupled to said feedback circuit for developing a reticle image intensity control signal having a magnitude inversely related to the gain of said amplifying means;

and means coupling said gain sensing means to said light emitting diode for applying said reticle image intensity control signal to said reticle generating means light emitting diode; whereby as the gain of said amplifying means varies, said reticle image intensity control signal regulates the intensity of said light emitting diode to maintain at said display means a visible reticle of essentially constant brightness notwithstanding variations in the gain of said amplifying means.

* * * * *